G. H. BERGMAN.
COMBINED SHAFT LOG, STUFFING BOX, AND ADJUSTABLE BEARING.
APPLICATION FILED SEPT. 22, 1916.
1,276,613.
Patented Aug. 20, 1918.
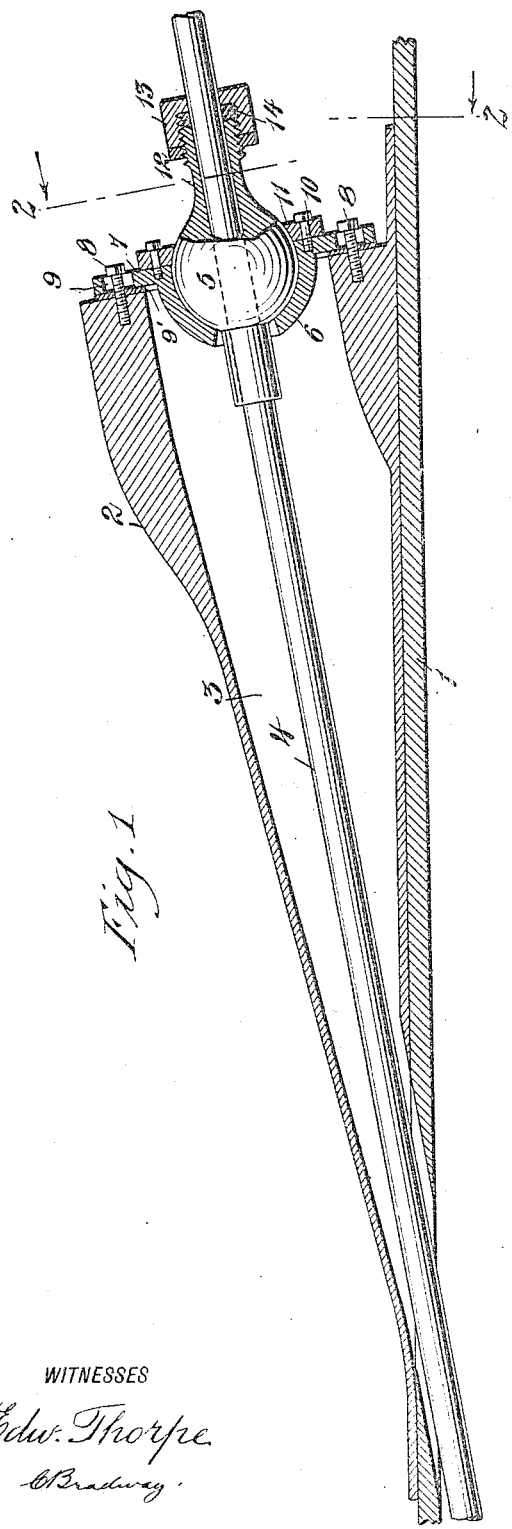
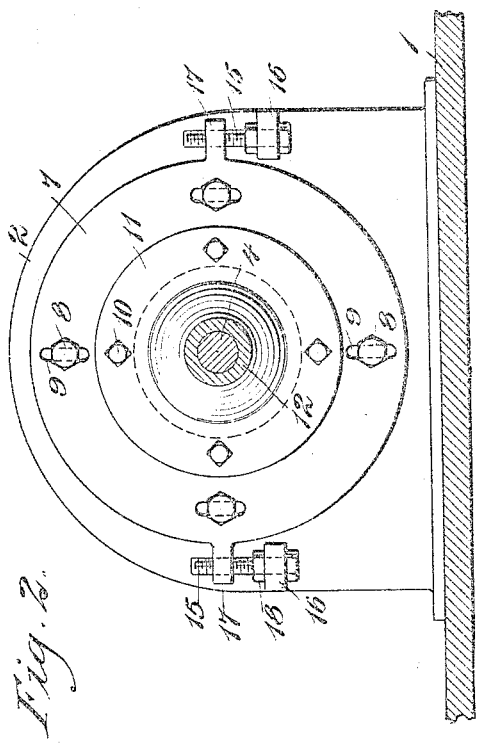
WITNESSES
Edw. Thorpe
C. Bradway
INVENTOR
G. H. Bergman
BY
ATTORNEYS

UNITED STATES PATENT OFFICE.

GUY H. BERGMAN, OF TANANA, TERRITORY OF ALASKA.

COMBINED SHAFT-LOG, STUFFING-BOX, AND ADJUSTABLE BEARING.

1,276,613.

Specification of Letters Patent.

Patented Aug. 20, 1918.

Application filed September 22, 1916. Serial No. 121,610.

*To all whom it may concern:*

Be it known that I, GUY H. BERGMAN, a citizen of the United States, and a resident of Tanana, in the Territory of Alaska, have invented a new and Improved Combined Shaft-Log, Stuffing-Box, and Adjustable Bearing, of which the following is a full, clear, and exact description.

This invention relates to propeller shafts for motor boats and has to deal more particularly with a combined shaft log, stuffing-box and adjustable bearing.

The invention has for its general objects to improve the construction and operation of devices of the character referred to so as to enable the propeller shaft to be easily alined after the boat has been launched and it has acquired its normal floating shape. In small launches the shape of the boat changes after the boat has been placed in the water, and this change in shape tends to throw out of line the shaft bearings so that the motor cannot operate efficiently because of binding and undue friction. By means of the present invention this difficulty can be easily and quickly overcome.

Another object of the invention is to provide an improved shaft log, stuffing-box and adjustable bearing which is of comparatively simple and inexpensive construction, reliable and efficient in use, and so designed as to enable a quick adjustment while insuring a water-tight joint.

With such objects in view, and others which will appear as the description proceeds, the invention comprises various novel features of construction and arrangement of parts which will be set forth with particularity in the following description and claim appended hereto.

In the accompanying drawing, which illustrates one embodiment of the invention and wherein similar characters of reference indicate corresponding parts in both the views, Figure 1 is a longitudinal section of a shaft log with the invention applied thereto; and Fig. 2 is a transverse sectional view on the line 2—2, Fig. 1.

Referring to the drawing, 1 designates the bottom or keel of a boat and 2 the shaft log which is provided with a chamber 3 through which extends the propeller shaft 4. This shaft passes through an approximately spherical bearing member 5 which is seated in a hemispherical bearing socket 6, the latter being formed on a circular plate or disk 7 that is fastened by bolts 8 to the end of the log 2. The bolts pass through vertical slots 9 for enabling the socket plate to be moved up or down, and when properly adjusted the bolts clamp it tight. Interposed between the socket plate and the log is a suitable gasket 9'. On the plate 7 is fastened by bolts 10 a retaining plate 11 having an opening of smaller diameter than the bearing member 5, so as to retain the latter in the socket 6. The bearing member 5 has an extension or neck 12 on which is a gland nut 13 for compressing a packing 14 around the shaft, so as to prevent leakage along the same.

The vertical adjustment of the socket plate 7 is effected by means of adjusting bolts 15 which are carried by lugs 16 on the log, and these bolts pass through threaded ears 17 on opposite sides of the plate 7. The bolts are vertical or parallel with the slots 9, so that by turning the bolts the socket plate can be raised or lowered. The bolts can be held in place by jam nuts 18.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claim.

Having thus described my invention, I claim as new and desire to secure by Letters Patent:

The combination of a shaft log having a passage therethrough, a propeller shaft extending through the passage, a plate having a hemispherical socket and an opening, the shaft extending through the opening, a ball-shaped bearing disposed in the socket and through which the shaft extends, means for adjustably fastening the plate to the said log, a stuffing box on the bearing and through which the shaft extends, and devices mounted at opposite sides of the plate and carried by the said log for moving the plate in its own plane for adjusting the position of the shaft.

GUY H. BERGMAN